United States Patent [19]

Jablecki

[11] 4,031,032

[45] June 21, 1977

[54] LIQUID PHASE SEPARATOR WITH VALVED OUTLET MEANS

[76] Inventor: Elizabeth S. Jablecki, 1422 Damon Court, SE., Rochester, Minn. 55901

[22] Filed: June 10, 1975

[21] Appl. No.: 585,475

[52] U.S. Cl. .............................. 210/474; 141/344; 222/460

[51] Int. Cl.² ................. B01D 23/28; B01D 35/00

[58] Field of Search ............ 210/474, 94, 465, 463, 210/466–472; 222/460; 141/331, 344; 251/305, 326, 315; 23/259; 73/422 GC

[56] References Cited

UNITED STATES PATENTS

| 66,127 | 6/1867 | Catlin | 210/474 |
|---|---|---|---|
| 155,386 | 9/1874 | Richardson et al. | 210/474 |
| 251,773 | 1/1882 | Eggers | 210/474 |
| 1,042,317 | 10/1912 | Case | 210/474 |
| 1,734,841 | 11/1929 | Walden | 210/474 |
| 1,744,798 | 1/1930 | Price | 251/305 |
| 3,160,015 | 12/1964 | Charlton et al. | 73/422 GC |
| 3,780,985 | 12/1973 | Perry | 251/315 |
| 3,865,023 | 2/1975 | Halvorsen | 141/331 |

*Primary Examiner*—Frank W. Lutter
*Assistant Examiner*—Frank Sever
*Attorney, Agent, or Firm*—Ralph W. Kalish

[57] ABSTRACT

A separator for immiscible, emulsionless-forming liquids of different specific gravity which comprises a preferably transparent vessel; a valve provided in the lower end of said vessel for movement between open and closed condition whereby through disposition in the former, the heavier liquid may be discharged into a receptacle upon which said separator is stably disposed by means of a support plate.

6 Claims, 10 Drawing Figures

U.S. Patent   June 21, 1977   4,031,032
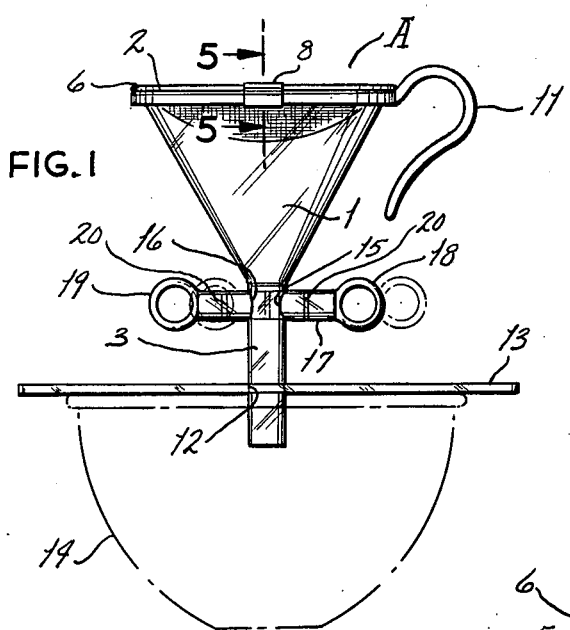
FIG. 1
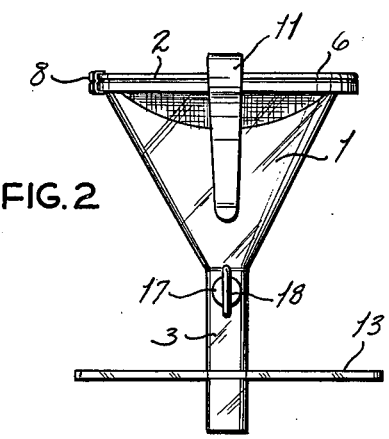
FIG. 2
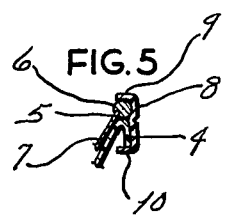
FIG. 5
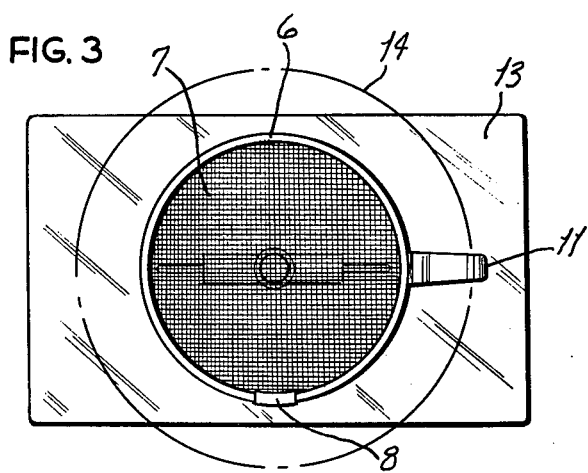
FIG. 3
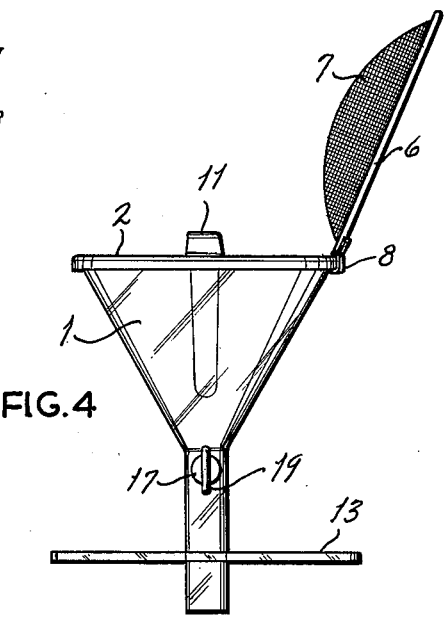
FIG. 4
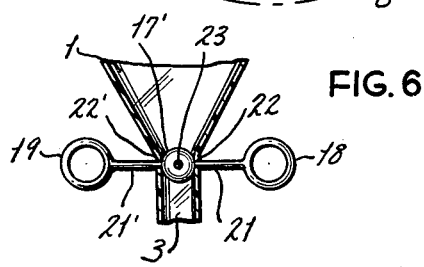
FIG. 6
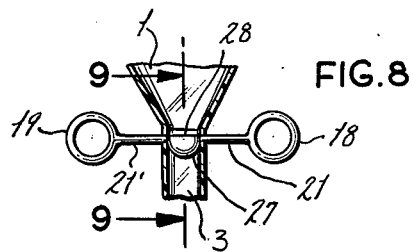
FIG. 8
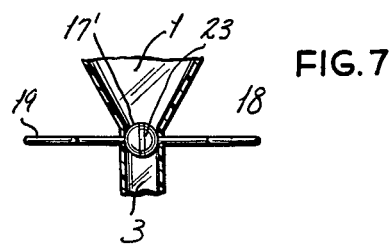
FIG. 7
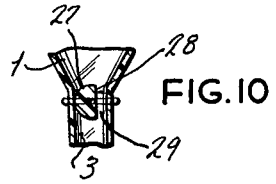
FIG. 9
FIG. 10

LIQUID PHASE SEPARATOR WITH VALVED OUTLET MEANS

BACKGROUND AND SUMMARY OF THE INVENTION

This invention relates in general to separators and, more particularly, to a so-called liquid-liquid separator.

It is an object of the present invention to provide a separator adapted to readily effect the separation of one liquid from another wherein the same are immiscible, do not form an emulsion, and have different specific gravities, with the construction being relatively simple so as to be easily utilized, both domestically as well as in laboratories.

It is another object of the present invention to provide a separator of the character stated which embodies novel support structure so that the separator may be disposed in reliable fashion upon a collector or receptacle thereby freeing the operator from the usual necessity of holding a separator in operating position.

It is another object of the present invention to provide a separator of the character stated which may be formed of relatively inexpensive transparent material so that the user may readily visually determine the completion of the separation operation.

It is a further object of the present invention to provide a separator of the character stated which may be designed to conduce to gravity flow upon termination of separation and by embodying a relatively narrow discharge conduit for inhibiting the likelihood of removal of other than merely the intended liquid.

It is another object of the present invention to provide a device of the character stated which may embody any of a multiplicity of flow control elements which are easily manipulated and which are of simple construction.

It is a still further object of the present invention to provide a separator of the character stated which is extremely versatile in usage, having relatively wide application; which is especially suitable for domestic purposes; which is amenable to high volume, low cost production; and which is durable in usage.

BRIEF DESCRIPTION OF THE DRAWINGS

FIG. 1 is a front elevational view of a liquid separator constructed in accordance with and embodying the present invention illustrating same in mounted disposition upon a receptacle, and incorporating one form of control valve.

FIG. 2 is a side elevational view of the separator, and incorporating a second form of control valve.

FIG. 3 is a top plan view of the device as shown in FIG. 1.

FIG. 4 is a side elevational view of the separator illustrating the strainer in inoperative position and incorporating the second form of control valve.

FIG. 5 is a vertical transverse sectional view taken on the line 5—5 of FIG. 1.

FIG. 6 is a front view in partial section of the control valve illustrated in FIG. 2 showing said second form of valve in closed condition.

FIG. 7 is a front view in partial section of the control valve illustrated in FIG. 2 showing said second form of valve in open condition.

FIG. 8 is a front view in partial section of the control valve illustrated in FIG. 2 showing a third form of control valve with the same being in closed condition.

FIG. 9 is a vertical transverse sectional view taken on the line 9—9 of FIG. 8.

FIG. 10 is a vertical transverse sectional view taken substantially on the line 9—9 of FIG. 8 but showing the third form of control valve in open condition.

DESCRIPTION OF THE PRACTICAL EMBODIMENTS

Referring now to the drawings which illustrate practical embodiments of the present invention, A designates a liquid receiving vessel having a body 1 of generally inverted conical contour, tapering uniformly inwardly from a relatively enlarged upper open end, or mouth, 2. At its lower end said body 1 is centrally continuous with a tubular extension 3 having an internal diameter substantially the same, but not necessarily, as the lower end of said body 1; said extension being open at its lower end. The volume of body 1 and the length of extension 3 is a matter of choice dependent upon the quantity of the batch of liquid to be subjected to separation.

At its upper end body 1 is provided with an outer, downturned short flange or skirt 4 causing the development of an upper end edge 5 upon which may be disposed the rim 6, as of wire or the like, or a strainer 7 being of suitable mesh size for withholding any solid matter entrained in the liquid mass to be subjected to separation. Strainer 7 is retained upon vessel A as by means of a hinge 8 which may, if desired, be formed of plastic, and having upper and lower flanges 9,10 for engaging strainer rim 6 and the lower end edge of flange 4 (see FIG. 5). Integral with flange 4 is a handle 11, as of customary design, to provide the user with the means for manipulating vessel A.

As may best be seen in FIG. 1, tubular extension 3 projects through an opening 12 formed in a flat support plate 13 for limited extension therebelow. Said extension 3 is rigid within said opening 12 with such being effected by any suitable means, such as a jam fit, an adhesive or integral formation. Plate 13 is of suitable dimension for resting disposition upon the upper edge of a collector or receptacle 14.

At its upper end immediately adjacent the lower end of vessel body 1, tubular extension 3 is provided with a pair of transversely aligned apertures 15,16, which serve as bearings for receiving an elongated cylindrical control valve body 17 extending therethrough and with its ends spaced from the proximate portions of extension 3 for accommodating at each of its ends flattened grippable tabs 18,19, by use of which, said valve 17 may be rotated within apertures 15,16 or moved longitudinally of its axis, as suggested by phantom lines in FIG. 1. Valve body 17 may be provided with one or more passageways 20, the axis of which is normal to the longitudinal axis of valve body 17, and which when appropriately disposed with respect to tubular extension 3 as by manipulation of tabs 18,19, serves as a conduit for connecting vessel body 1 and extension 3 for liquid flow therethrough. It will thus be seen that valve body 17 is so related to apertures 15,16 as to provide a substantially fluid-proof joint therewith as well as to be rotatable, as well as longitudinally shiftable for effecting operative disposition of the particular passageway 20.

In actual usage, vessel A is utilized in a so-called liquid-liquid separation wherein the liquids to be separated are immiscible; do not form an emulsion; and possess different specific gravities. Thus, for instance, an oil and water mixture would be readily amenable to separation by the present invention since with control valve 17 in closed condition, vessel body 1 would be supplied with the particular mixture and upon completion of the separation, as may be readily visually detected, valve 17 may then be manipulated to permit flow of the water through passage 20 into receptacle 14 until the line of demarcation between the water and oil strata has descended to a point immediately above said valve 17 whereupon the latter may then be closed, inhibiting further flow and with receptacle 14 thus containing the water and the oil being then subject to discharge from the upper open end of vessel A. The foregoing is merely an example since a separator of the present invention would have widespread utilization in chemical laboratories wherein the liquids involved meet the foregoing criteria.

On a more domestic level, it will be appreciated that the present invention would have wide application in the average household kitchen wherein it was desired to separate fat or grease from meat juices, soup stock, etc.

Accordingly, it would be desired that vessel A be fabricated of transparent material, such as a plastic, so that the critical line of demarcation between the liquid to be separated or the interface may be easily determined. It is further within the contemplation of this invention that the valve body 17 may be located downwardly within tubular extension 3 relatively spacedly from the lower end of vessel body 1 so that the interface would be visible within such extension. Plate 13 serves as a most important element of device A since it renders same stable in operative position thereby freeing the user's hands for other tasks and, of course, inhibits any accidental tendency to tilt or turn during operation. As is evidenced by the pivoted connection of strainer 7, the same is adapted for optional utilization.

Referring now primarily to FIGS. 6 and 7 as well as FIGS. 2 and 4, a second form of control valve, indicated 17', is shown; it being recognized that like components will bear like reference numerals. Said control valve 17' is of spherical form and having a diameter substantially equivalent to the diameter of tubular extension 3 for snug disposition therein but yet permitting of rotation about its axis by means of diametrally opposed, relatively narrow arms 21,21' which project through transversely aligned openings 22,22' at the upper end of said tubular extension 3. Said arms 21,21' are of relatively reduced cross section and at their ends integrally mount tabs 18,19 for facilitating rotative movement of said valve 17', which contains a diametral bore 23 for axial alignment with tubular extension 3 (see FIG. 7) for providing a liquid communicating path between vessel body 1 and said extension 3 upon rotation of said arms 21,21' through an angle of 90° from the position shown in FIG. 6 in which latter FIG. said valve control member is illustrated as being closed.

Referring now to FIGS. 8, 9, and 10 a third form of valve control member 27 is illustrated and with like numerals indicating like components. Said valve control member 27 is of parti-spherical form having a maximum diameter substantially equivalent to the inside diameter of extension 3 so that the same will occlude said extension 3 when said normally upper face, as at 28, of said valve control is presented upwardly (see FIG. 8). Projecting from opposite sides of said valve control member 27 are arms 21,21' carrying manipulation tabs 18,19, respectively, which arms extend through compatible openings 22,22' in said extension 3. By turning said arms 21,21' through an angle of 90° said valve member 27 will be commensurately rotated so that its normally upper face 28 will be directed laterally and in spaced relationship to the confronting side wall portion of extension 3 to thereby define a liquid passageway 29 to permit flow of liquid from vessel body 1 downwardly through extension 3.

Accordingly, the foregoing demonstrates that the present invention is amenable for utilization with a variety of relatively simple valve constructions without departing from the spirit of the present invention.

Having described my invention, what I claim and desire to obtain by Letters Patent is:

1. A device for separating immiscible liquids having different specific gravities and different visually determinable characteristics comprising a container of transparent material having an upper end portion and a lower end portion, said container having a relatively large opening in the upper end portion thereof for entry of immiscible liquids to be separated, said container lower end portion being of reduced cross section relative to the container upper portion and constituting an elongated conduit, said container having a relatively small discharge opening at the end of said elongated conduit remote from said container upper portion, valve means disposed within said elongated conduit, said elongated conduit being provided with transversely aligned openings defining bearings, said valve means extending through said aligned openings and being journalled therein for rotative movement about an axis perpendicular to the longitudinal axis, said valve means comprising an elongated cylindrical body having at least one transverse bore therethrough for disposition within said elongated conduit such that through movement along an axis perpendicular to the longitudinal axis of said device, said bore is movable between open and closed condition with respect to the flow of liquid from said container upper portion into and through said elongated conduit.

2. A device for separating immiscible liquids as defined in claim 1 and further characterized by support means connected to said container below said valve means for supporting said container.

3. A device as defined in claim 2 and further characterized by said support means comprising a flat plate, said plate being apertured for extension of said container elongated conduit therethrough.

4. A device as defined in claim 3 and further characterized by the entire periphery of said plate extending outwardly of the periphery of said container.

5. A device as defined in claim 1 and further characterized by strainer means provided for disposition across said relatively large opening of said container.

6. A device as defined in claim 5 and further characterized by hinge means mounting said strainer means on said container for swingable movement of the same within a vertical plane between operative disposition across said relatively large opening and inoperative position displaced therefrom.

* * * * *